E. L. BURRELL.
METHOD OF SPLICING BELTING MATERIAL.
APPLICATION FILED JAN. 2, 1915.

1,207,853.

Patented Dec. 12, 1916.

Witnesses:
Walter F. Stone
William E. Hann.

Inventor:
Ernest L. Burrell
By Rummler & Rummler
Attys.

UNITED STATES PATENT OFFICE.

ERNEST L. BURRELL, OF CHICAGO, ILLINOIS.

METHOD OF SPLICING BELTING MATERIAL.

1,207,853.  Specification of Letters Patent.  Patented Dec. 12, 1916.

Application filed January 2, 1915. Serial No. 179.

*To all whom it may concern:*

Be it known that I, ERNEST L. BURRELL, a citizen of the United States of America, and a resident of Chicago, county of Cook, and State of Illinois, have invented certain new and useful Improvements in Methods of Splicing Belting Material, of which the following is a specification.

The main objects of this invention are to provide an improved method of splicing power transmission belts wherein the splice is made equally as strong as any part of the belt; to provide an improved method of reinforcing the splice in endless belts, particularly cotton woven belts, so as to prevent fraying of the ends of the material or the opening of the splice; to provide an improved arrangement of the reinforcing means so as to avoid the formation of a ridge that would have an abrupt approach to the pulley; and to provide an improved form of scarfed joint for flexible belts.

An illustrative embodiment of this invention is shown in the acompanying drawings, in which:—

Figure 1:
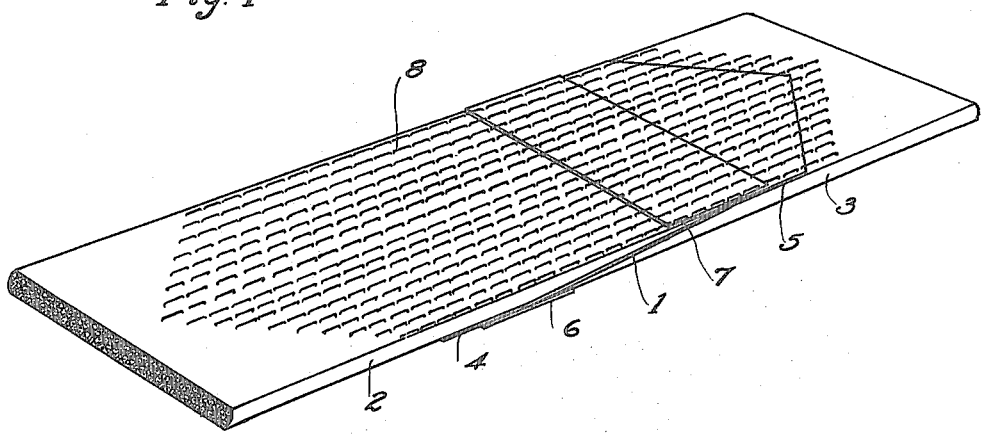
Figure 2:
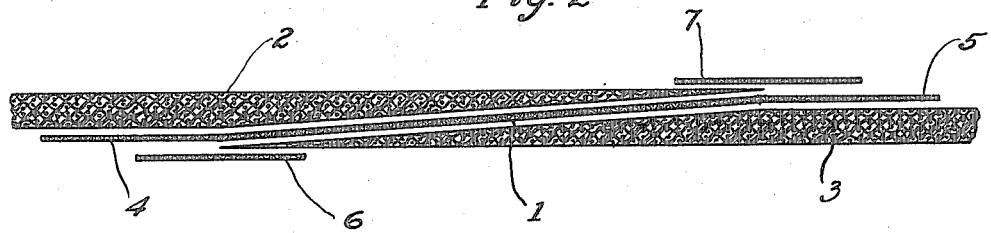
Figure 3:
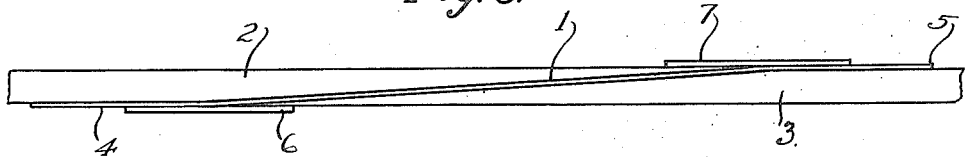

Figure 1 is a perspective view of a piece of a strip of woven cotton belting showing the improved splice. Fig. 2 is an enlarged longitudinal sectional detail of the splice showing the several parts thereof in their relative longitudinal positions but spaced apart transversely. Fig. 3 is a similar view with the parts secured together.

Heretofore solid woven belts have been made endless by skiving the ends that are to be overlapped so as to make a scarfed splice, the same as is used in leather belts. In skiving down the ends of the material it is, of course, necessary to cut the threads of the belting material and as this weakens the structure of the web, it has heretofore seemed practically impossible to secure the ends together in a way that would make a joint as strong as any other part of the belt without unduly increasing the thickness thereof at the joint. By reason of the cutting away of part of the fibers, scarfed joints, if made as in leather belts, are insecure and otherwise objectionable, because the tapered ends of the material have a tendency to fray and allow the splice to open. For this reason the use of endless woven cotton belts has been very limited.

In the construction shown in the drawings, these difficulties and objections have been overcome without appreciable increase in the thickness of the belt at the joint. A strip of thin material 1 is inserted between the overlapped beveled ends of parts 2 and 3 of the belt and the whole is securely cemented together. The insert 1 is preferably a strip of fabric of much finer weave than the belt itself, preferably a high grade canvas. The strip 1 is made of such length that the ends 4 and 5 extend beyond the parts 2 and 3 and are secured to the respective faces thereof. The strip 1 thus becomes a container for the cement and at the same time serves as a tie for the two ends of the belt. In order to further prevent fraying of the belt ends, other strips of material 6 and 7 similar to the insert are then cemented over the feather ends of the parts 2 and 3, as shown. After the splice has been completed in this way it is sewed with a sufficient number of rows of stitches 8 which extend throughout the length of and slightly beyond the ends of the insert 1. When the sewing is done in this manner, the threads which make up the stitching add very materially to the strength of the joint because they provide long fibers running lengthwise through the joint and thoroughly bonded with the belting at both ends of the joint.

The canvas insert 1 is cut pointed at its ends, as shown in Fig. 1, so that the slightly thickened part of the belt approaches the pulley first as a point, and then gradually widens to the entire width of the belt instead of having an abrupt approach to the pulley, as would be the case if the insert were cut straight across.

Although but one specific embodiment of this invention has been herein shown and described, it will be understood that some of the details of the construction shown may be altered or omitted without departing from the spirit of this invention as defined by the following claims.

I claim:—

1. The improved method of splicing belting material which consists in overlapping the ends of the belting and inserting a sheet of fibrous material between the overlapped ends of the belting material and fastening these together, said sheet being extended beyond said ends of the belting and the ends of said sheet being fastened to the opposite faces of said belting material.

2. The improved method of splicing belting material which consists in overlapping the ends of the belting, inserting between said overlapped ends a sheet of fibrous material which extends beyond the ends of the belting, and then stitching said ends and sheet together by means of threads running lengthwise of the belting and extending beyond the ends of said sheet.

3. The improved method of splicing belting material, which consists in tapering the ends that are to be overlapped, cementing between said ends a sheet of thin material having fibers extending lengthwise of the belt, said sheet being extended beyond said overlapped ends and stitching said sheet and overlapped ends together.

4. The improved method of splicing belting material which consists in tapering the ends of the belting, overlapping such tapered ends, inserting between them a sheet of fibrous material and fastening said ends and sheet together, and securing other strips of thin material upon the faces of said belting material to cover the ends thereof.

5. The improved method of splicing belting material which consists in overlapping the ends of the belting, inserting between said overlapping ends a sheet of fibrous material having the ends thereof pointed, said sheet being extended beyond the ends of the belting, and the ends of said sheet being fastened to the opposite faces of said belting material.

Signed at Chicago this 31st day of Dec., 1914.

ERNEST L. BURRELL.

Witnesses:
PAUL J. BUSS,
E. F. MAYER.